United States Patent [19]

Johnson

[11] Patent Number: 4,899,868

[45] Date of Patent: Feb. 13, 1990

[54] CONVEYOR FOR A CROP HARVESTER

[75] Inventor: David W. Johnson, Bennet, Nebr.

[73] Assignee: The Goodyear Tire & Rubber Company, Akron, Ohio

[21] Appl. No.: 341,244

[22] Filed: Apr. 19, 1989

Related U.S. Application Data

[63] Continuation of Ser. No. 206,901, Jun. 15, 1988, abandoned, which is a continuation of Ser. No. 903,521, Sep. 4, 1986, abandoned.

[51] Int. Cl.$^4$ .............................................. B65G 65/06
[52] U.S. Cl. .................................... 198/520; 198/728; 56/16.4
[58] Field of Search .................... 198/510.1, 513, 520, 198/518, 690.2, 699.1, 728, 733, 817, 834, 803.2, 844, 846, 847; 56/13.9, 16.4, 364

[56] References Cited

U.S. PATENT DOCUMENTS

| | | | |
|---|---|---|---|
| 2,846,052 | 8/1958 | Heinemann et al. | 198/728 |
| 3,853,016 | 12/1974 | Lane et al. | 198/847 |
| 4,072,062 | 2/1978 | Morling et al. | 198/834 |
| 4,548,315 | 10/1985 | Briggs | 198/728 |
| 4,553,663 | 11/1985 | Johnson | 198/803.2 |

FOREIGN PATENT DOCUMENTS 151284  11/1979  Japan .................................. 198/728

Primary Examiner—Joseph E. Valenza
Attorney, Agent, or Firm—Marc R. Dion, Sr.

[57] ABSTRACT

There is disclosed a flexible rubber belt having molded lugs on the bottom surface and at least one row of molded cleats on the top surface. A plurality of these belts are transversely spaced apart to form a conveying assembly. The conveying assembly is useful as a drag or raddle chain conveyor in combines or in round balers.

6 Claims, 2 Drawing Sheets

CONVEYOR FOR A CROP HARVESTER

This application is a continuation of Ser. No. 07/206,901 filed on June 15, 1988, now abandoned, which was a continuation of Ser. No. 06/903,521 filed on Sept. 4, 1986 now abandoned.

BACKGROUND OF THE INVENTION

This invention generally relates to crop harvesters and, more particularly, to an improved, flexible belt conveyor which may be used for moving cut grain from one level in the combine harvester to a higher level. This invention is particularly useful in a drag conveying apparatus in which the material to be conveyed is trapped between a floor and a multiple conveyor belt assembly to effect the upward transport of the material by dragging it up the incline. This is in contrast to the more common method of conveying where the transported material is carried on the upper portion of the belt. It also is useful in hay balers for the formation, containment and compaction of cut hay into large cylindrical bales.

Drag conveyors as known in the prior art are composed of mechanical chains with metal crossbars traversing the open distance between the chains. These chains are composed of a multiplicity of parts, including plates, pins, brackets and miscellaneous linkage parts. These mechanical chain conveyors suffer from a number of problems due to the many parts involved. These mechanical chains are subject to stretching due to wearing and elongation of the holes through which the link pins or other fastening means are located. Over a relatively short period of operation, the mechanical chain will actually expand in overall length by several inches requiring constant adjusting during harvesting operations to take up the slack created. If one of the metal pieces is broken and becomes entrained with the crop that is being harvested, the dislodged part may seriously damage or cause a lockup of downstream processing mechanisms in the harvester including knife cylinders, high speed fans, etc. A major performance limitation of the mechanical chain configuration of the prior art is that it is limited to low speed operation and is objectionably noisy. In addition, continuous maintenance is required on the prior art chains, the need for lubrication is constant, and metal parts must periodically be replaced. The metallic chains are also very heavy and add to the weight of the harvester.

Flexible belts having lugs on one surface adapted for positive driving by a sprocket and having molded transverse ribs on the upper surface are known for crop gathering use. A pair of belts are positioned to entrap grain stalks between the opposed ribbed surfaces of the belts. Such belts suffer the disadvantage that when a transverse cleat is damaged, or ripped off during harvesting operations, the entire belt must be replaced. Such an occurrence is not unusual when crop residue, rocks or debris become jammed in the conveyor. A belt having the transverse molded ribs covering the complete width of the conveying mechanism in a combine adds considerable weight to the harvester and is very expensive to produce as an endless belt without mechanical splice.

U.S. Pat. No. 4,553,663 issued on Nov. 19, 1985 by the inventor herein describes a crop conveying apparatus that uses flexible rubber belts that have transverse connecting links positioned in cleat bores.

BRIEF DESCRIPTION OF THE INVENTION

In view of these and other problems associated with presently known types of conveyor means for harvesters, this invention overcomes the shortcomings of the prior art conveyors. An advantage of this invention is to provide a multiple flexible endless belt conveyor that eliminates the maintenance requirements, damage potential, and excessive weight of prior art conveyors. The present invention substantially eliminates moving mechanical parts that can be lost thus avoiding damage to downstream crop processing mechanisms. It further provides quiet operation without need for lubricants. The design provides easy replacement of the belt which may be damaged during operation. Much higher speeds of operation of the conveying mechanism can be attained through use of this invention. These advantages are accomplished using a crop conveying assembly comprising: a plurality of side by side transversely spaced, flexible belts free of transverse connecting links and having widths which are narrower than said transverse spacing and positioned transversely between the edges of an idler drum and a driving sprocket drum, each of said belts having an elastomeric body with a top surface, a bottom surface, a longitudinally substantially inextensible tensile member disposed within said elastomeric body, a plurality of longitudinally spaced integrally molded lugs on the bottom surface and a plurality of longitudinally spaced raised cleats integrally molded to the top surface.

BRIEF DESCRIPTION OF THE DRAWINGS

The features and advantages of the invention will be better understood from a consideration of the following description when taken in conjunction with the accompanying drawings in which.

DISCLOSURE OF THE INVENTION

There is disclosed a crop conveying assembly comprising: a plurality of side by side, spaced apart, flexible belts; each of said belts having an elastomeric body with a top surface, a bottom surface, a high modulus tensile member disposed within said elastomeric body, a plurality of longitudinally spaced lugs integrally molded to the elastomeric body to form the bottom surface, a plurality of longitudinally spaced raised cleats integrally molded to the elastomeric body to form the top surface; and a conveyor bottom surface which traps the crop to be conveyed by the belts.

There is also disclosed a flexible conveyor for a crop harvester having a longitudinal direction and a transverse direction comprising:

(a) a plurality of side by side, transversely spaced flexible belts, each belt having an elastomeric body, a top surface, a bottom surface, and a tensile member substantially inextensible in the longitudinal direction embedded in the elastomeric body, a plurality of elastomeric body to form the bottom surface, a plurality of longitudinally spaced apart cleats integrally molded to the elastomeric body to form the top surface;

(b) at least one toothed pulley positioned to meshingly engage said lugs in said belt.

DETAILED DESCRIPTION OF THE INVENTION

Figure 1:
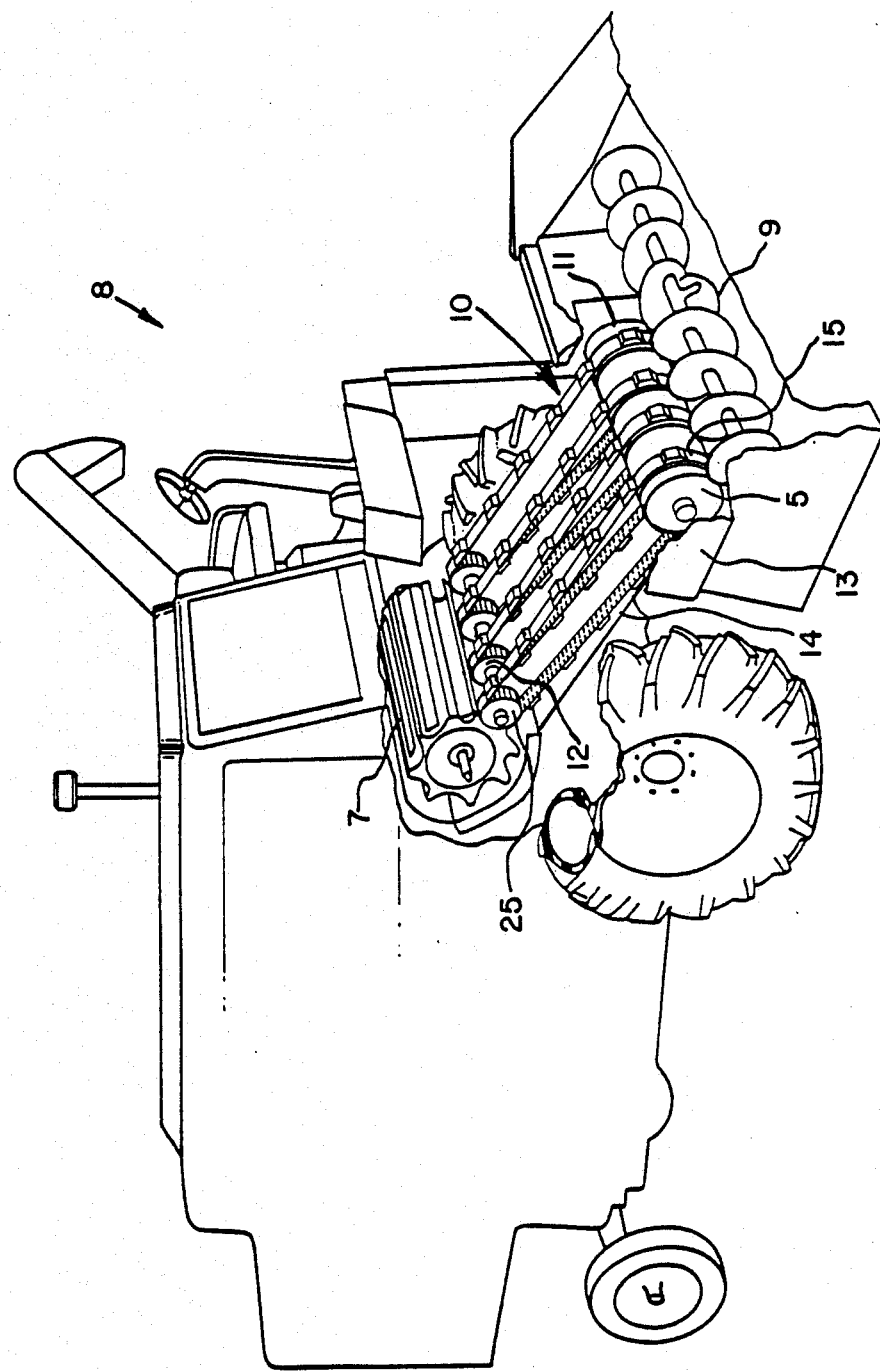
FIG. 1 is a perspective view of a combine harvester with portions of the housing cut away to expose a feeder house conveyor equipped with the crop conveying assembly of the invention.

Referring to FIG. 1, a conveyor for a combine harvester 8 is generally indicated by a reference numeral 10. The forward end 11 of the conveyor is positioned toward the crop gathering forward end of the combine 8. An auger 9 may feed the conveyor. The rearward end 12 discharges the crop into an additional processing step in the combine such as a cylinder 7. The harvester conveyor 10 includes a shroud 13 which completely encloses the conveyor during operation. The shroud 13 includes an inclined conveyor bottom surface 14. The conveyor shown in FIG. 1 and FIG. 2 includes four parallel spaced belts 15, 16, 17, 18 and which are rotatably mounted on drive and idler means shown in FIG. 2 as a number of toothed pulleys 25, 26, 27 and 28 and an idler drum 5.

Figure 2:
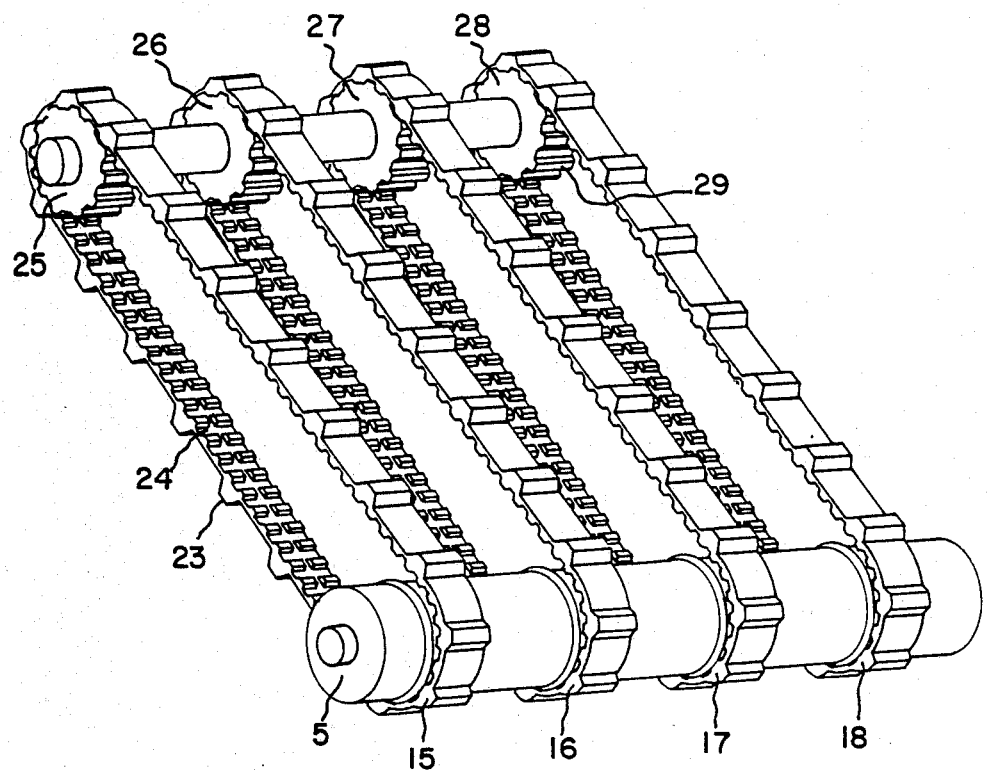
FIG. 2 is an isometric view of the crop conveying assembly of FIG. 1, removed from the combine to expose the complete crop conveyor with sprockets and idler.

Referring to FIG. 2 the belts 15-18 and the drive and idler means are shown in isolation. The belts 15-18 are identical in construction.

Figure 3:
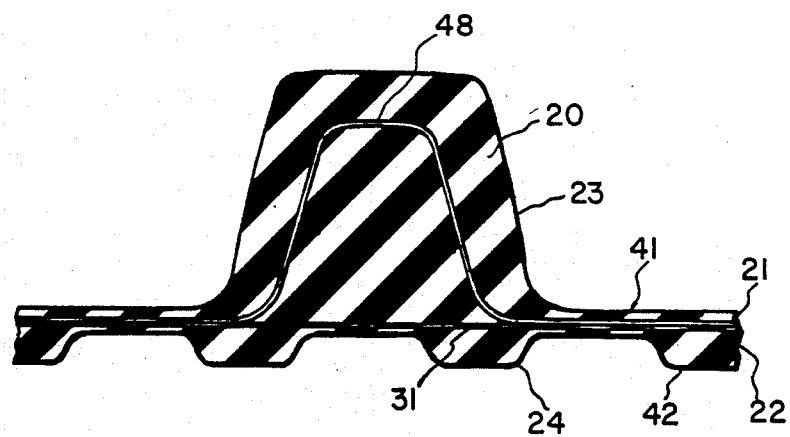
FIG. 3 is a portion of the longitudinal cross-sectional view of the preferred embodiment of an endless flexible belt as shown in FIG. 2 utilizing longitudinal reinforcement in the cleat.

Referring now to FIG. 3, the belts 15-18 are composed of an elastomeric body 20 made from an elastomeric and resilient material suitable for the working environment. The elastomeric body 20 may be a unitary structure or may include a first layer 21 and a second layer 22 which are substantially parallel and composed of the same or different elastomeric and resilient materials. Representative of the elastomeric materials which may be used include thermosetting natural or synthetic rubbers, thermoplastic elastomers and urethanes. The first layer 21 includes integrally molded elastomeric cleats 23 to form the top surface 41. The cleats 23 are spaced regularly around the full longitudinal or circumferential length of the belts 15-18. The second layer 22 forms a positive driving portion of the belts 15-18 and includes a plurality of longitudinally spaced lugs 24, integrally molded to the second layer to form the bottom surface 42. The lugs may have any desired spacing for meshing with a tooth pulley or sprocket. A single row of lugs may be utilized, however, it is preferable that there be two rows of lugs on the second layer spaced transversely apart. The sprockets 25-28 utilized in the crop conveying assembly of FIG. 2 contain lug engaging teeth 29. While FIG. 2 shows two rows of lugs 24 on each belt, it may be desirable to have three or more such rows or a single row of lugs recognizing that the sprocket utilized would be complementary to the lug configuration. Special tough, abrasion resistant elastomers may be utilized for the first layer 21 and/or the second layer 22 to provide extra shear force resistance to the lugs 24 and cleats 23. Oriented fiber reinforced rubber compounds are particularly adapted for meeting these requirements.

Imbedded within the polymeric body 20 or alternatively positioned between the first layer 21 and second layer 22 is a longitudinal load bearing tensile member 31. The tensile member should be substantially inextensible in the range of working tension exerted during use in a crop conveying assembly. The tensile member 31 may be composed of any conventionally used high modulus of elongation material which exhibits elongation in an acceptable range for the tension which is exerted on the belt during operation. Steel wire, fiberglass, or aromatic polyamide are preferred high modulus load bearing members due to their low elongation at high tensile stresses. Other conventional tensile members such as polyester, nylon and rayon may be used for lighter duty applications where the working tension placed on the belt during operation is relatively low. The tensile member may be formed in any conventionally known manner including spiralling one or more strands onto a forming mandrel to form a continuous, endless tensile member. Alternatively, strips of reinforcement having a longitudinally oriented tensile material such as tire cord fabric may also be overlap spliced to form a continuous tensile member, which has sufficient splice strength to remain substantially inextensible at operating tensions.

Additional plies of reinforcing fabric may be positioned over and/or under the load bearing tensile member 31. The reinforcement layers may be formed of any conventional belt fabric such as square-woven, bias fabrics or cords to impart additional longitudinal and transverse strength and to protect the tensile member from damage during service.

The cleats 23, as shown in FIG. 3, are solid. The cleats 23, are the crop engaging portion of the crop conveying assembly. The cleats 23, scrape along the bottom surface or pan to trap the grain in front of the leading edge of the cleat 23, to transport the grain up the inclined surface 14. Height of the cleat, 23, refers to that dimension of the which lies perpendicular to the plane of the belt tensile member. Choice of cleat height should be made to assure sufficient structural strength of the link to withstand the external load stresses during operation of the crop conveying assembly and also to minimize the shearing stresses. The necessity for a lesser or greater height for the cleat is important in a drag conveying assembly as shown in FIG. 1 and FIG. 2 to assure that the cleats, 23, of each belt can scrape along the bottom 14 of the conveyor housing, thus efficiently pulling or dragging the grain up the inclined bottom surface 14.

An optional cleat reinforcement layer 48 is shown extending within the elastomeric cleat body essentially parallel to the top surface 41 of the cleat and extending down to run generally parallel to the load bearing tensile member 31. It follows a generally sinusoidal path essentially parallel to the top surface 41 of the belt. This cleat reinforcement layer 48 is useful in dissipating shear stresses which develop during operation of the crop conveying apparatus. Specially reinforced elastomeric compounds may be utilized in the molding of the cleat portion in order to provide additional resistance to these shear stresses.

FIG. 1 and FIG. 2 illustrate a crop conveying assembly possessing four parallel belts. It should be appreciated that the conveying assembly may possess as few as two belts or more than four as the width of the assembly needs to be increased or decreased.

The belts useful in this invention can be made according to conventional techniques for producing endless belts. A preferred endless belt uses a natural and styrene-butadiene rubber blend for the elastomeric body with a continuously wound, aromatic polyamide filament tensile member. The uncured belt composite is formed then subjected to heat and pressure to complete formation of the cleats and driving lugs and to cure the elastomer. The belts on a combine of FIG. 1 can be easily loosened by slackening the idler drum 5 shown in FIG. 1.

The crop gathering assembly of this invention is free of the operational difficulties associated with a belt assembly wherein a connecting link or a cleat is attached through a punched hole in the belt carcass. Any time a hole is punched through a belt carcass, this attachment point becomes a stress center during operations under tension, and the hole in the belt carcass will inevitably be the failure point. This invention allows for thinner, lighter weight belts, which can be run over small diameter sprockets and idlers at high speed, due to the relatively thin belt carcass required. Prior art assemblies where bolting of the cleat and/or the connecting link may be done through the belt carcass leads to inferior performance when compared to the crop gathering assembly of this invention. Actual field testing of the crop gathering assembly of this invention on a combine harvester demonstrated that conveyor speeds of 800 feet per minute were easily attainable using the rubber belt of this invention. This is in contrast to conventional mechanical chain connecting link configurations where 400 feet per minute is the maximum conveyor speed which may be obtained. Maximum longitudinal stretch may be limited to between ½ and 4 percent by use of the preferred very high modulus load bearing tensile members such as an aromatic polyamide, fiberglass, or steel cord. If other conventional tensile members material such as nylon or polyesters is used, stretch may exceed 4 percent. The degree of stretch is also dependent on working tension.

COMMERCIAL APPLICABILITY

The crop conveying assemblies composed of at least two belts spaced apart offer a greatly improved system for conveying grain within a harvester, or for forming and compacting large cylindrical bales in a hay baler. Each assembly is lightweight, requires no lubrication, has no metal parts, and with proper selection of the load bearing tensile member, exhibits virtually no stretching during crop gathering operations. All these attributes lead to low maintenance, long life, operating economy and quiet conveyor operation. Additionally, the conveyor can be run at greatly increased speeds when compared to the prior art mechanical chain link systems. Further, the weight saving is substantial: a metal chain conveyor for a small combine weighs 200 pounds while the rubber crop conveyor of this invention weighs only 90 pounds.

Both these and other advantages and embodiments of the present invention will be apparent to one skilled in the art upon close examination of the foregoing specification and the appended claims and drawing figures.

I claim:

1. A crop conveying assembly comprising:
a plurality of side by side, transversely spaced, flexible belts free of transverse connecting links and having a width which is narrower than said transverse spacing; each of said belts having an elastomeric body with a top surface, a bottom surface, a high modulus tensile member disposed within said elastomeric body, a plurality of longitudinally spaced lugs integrally molded to the elastomeric body to form the bottom surface, a plurality of longitudinally spaced raised cleats integrally molded to the elastomeric body to form the top surface; and a conveyor bottom surface which traps the crop to be conveyed by the belts.

2. A crop conveying assembly of claim 1 wherein the top surface of each cleat lie in an imaginary plane parallel to the tensile member.

3. A crop conveying apparatus as set forth in claim 1 wherein said belt is an endless type belt having elastomeric body composed of a first layer and a second layer having said tensile member interposed therebetween, said first layer having as its outer peripheral surface the top surface and being composed of a first flexible elastomeric material, said second layer having the bottom surface as its outer surface and being composed of a second flexible elastomeric material.

4. A crop conveying assembly as set forth in claim 1 wherein said longitudinally spaced lugs are arranged in a plurality of rows spaced transversely apart across said bottom surface of said belt.

5. A crop conveying assembly as set forth in claim 1 wherein said belt contains additional reinforcing layers positioned within said elastomeric body.

6. A crop conveying assembly as set forth in claim 5 wherein said belt includes a cleat reinforcing layer positioned within said elastomeric body across the full transverse width of the belt following a generally sinusoidal path parallel to the top surface of said belt, such that said cleat reinforcing layer lies below the top surface of the belt.

* * * * *